United States Patent [19]

Schwartz et al.

[11] Patent Number: 5,611,453
[45] Date of Patent: Mar. 18, 1997

[54] VESSEL FORMED OF POLYMERIC COMPOSITE MATERIALS

[76] Inventors: Ian F. Schwartz, 26 Loch Avenue, Parktown, Johannesburg; Mark A. Stone, 5 Langley Levy Street, Montgomery Park, Johannesburg, both of South Africa

[21] Appl. No.: 305,373

[22] Filed: Sep. 13, 1994

[51] Int. Cl.$^6$ .................................................. B65D 90/04
[52] U.S. Cl. ..................... 220/453; 428/34.9; 428/36.1
[58] Field of Search ........................... 220/453; 428/34.9, 428/36.1, 286, 480

[56] References Cited

U.S. PATENT DOCUMENTS

| | | | |
|---|---|---|---|
| 3,738,527 | 6/1973 | Townsend | 220/453 X |
| 3,814,275 | 6/1974 | Lemons | 220/453 X |
| 3,902,941 | 9/1975 | Withers | 220/453 X |
| 4,044,184 | 8/1977 | Ashida et al. | 220/453 X |
| 4,073,400 | 2/1978 | Brook et al. | 220/453 |
| 5,090,586 | 2/1992 | Mitchell | 220/453 |
| 5,344,038 | 9/1994 | Freeman et al. | 220/453 |

*Primary Examiner*—Daniel Zirker
*Attorney, Agent, or Firm*—Bacon & Thomas

[57] ABSTRACT

A vessel for containing or conveying a fluid comprises a wall having at least an inner layer adapted to be adjacent to or in contact with the fluid and an outer layer, each layer being comprised of a matrix of polymeric material, the polymeric materials of the inner and outer layers being differently constituted. The two layers are bonded together and the polymeric material of the inner layer has a coefficient of shrinkage during curing which is less than the co-efficient of shrinkage of the resin material in the outer layer so that the inner layer of the wall has a post-curing residual compressive stress induced therein by the outer layer. The invention extends to a method of forming a multi-layered polymeric vessel.

11 Claims, 1 Drawing Sheet

VESSEL FORMED OF POLYMERIC COMPOSITE MATERIALS

BACKGROUND TO THE INVENTION

THIS invention relates to the manufacture of plastics material vessels, particularly vessels for containing or conveying corrosive fluids. Such vessels may be used, for example, as reaction vessels in part of a chemical process facility, for pipes, or in many other applications.

Fibre reinforced plastics (FRP's), in various forms are used extensively as structural materials in a wide range of applications in, amongst others, the aerospace, transport, electrical, mining and chemical industries. These materials have, in certain applications, some advantages over traditional metallic materials including improved specific mechanical properties, manufacturability and corrosion resistance. This has led to widespread use of such materials in structures (eg containers and piping) used for the containment and reticulation of certain chemically corrosive mixtures. While in the majority of applications the materials have performed successfully, there have been instances of premature failure in service. In many cases these failures have been attributed to the mechanisms of environmentally assisted cracking including direct corrosion and erosion mechanisms. For a given chemical environment the rate of crack growth associated with this phenomenon has been shown to increase exponentially with the tensile stress level in the material exposed to the environment. Thus, failures by environmentally assisted cracking are much more likely to occur in cases where the exposed surface of the material in contact with corrosive agents is subject to tensile stress.

Tensile stresses on the exposed surfaces of structures may arise from applied mechanical loading or constrained thermal expansion. Over and above these, however, residual tensile stresses may exist in the exposed material. These stresses may have a number of sources but it has been shown that a major source of such stresses is constrained post-cure shrinkage of the material after or while being subjected to elevated temperatures. Such constraint can arise out of partial post-curing of the material due to temperature gradients developed in service or by differential shrinkage of layers within the material. Stresses of this nature, in excess of 20 MPa, have been measured in laboratory tests, and field tests have shown that similar stresses occur in practical situations. Such levels of stress have been shown to be sufficient to cause rapid failure by environmentally assisted cracking in certain chemical environments.

Such failures, which usually require premature removal of the structure from service, have been known to occur within months of structures going into service, whereas the design life of the structures might typically be more than five years. This obviously has extensive financial implications due to both replacement costs and production losses. Thus, a means of improving the situation would allow a significant saving in costs and increases in production for users of structures subject to environmentally assisted cracking.

SUMMARY OF THE INVENTION

According to the invention there is provided a vessel for containing or conveying a fluid comprising, a wall having at least an inner layer adapted to be in contact or adjacent a fluid to be contained or conveyed, and an outer layer, each layer being comprised of a matrix of polymeric material, the polymeric materials of the inner and outer layers being differently constituted, the two layers being bonded together, the polymeric material of the inner layer having a coefficient of shrinkage during curing which is less than the coefficient of shrinkage of the polymeric material in the outer layer so that the inner layer of the wall has a post-curing residual compressive stress induced therein by the outer layer.

One or both of the layers may have a reinforcement therein which in the preferred form of the invention is a fibre-reinforcement. The vessel is preferably subjected to a post-curing shrinkage operation.

The invention extends to a method of forming a vessel for conveying or containing a fluid, said method comprising the steps of:

forming a multi-layered wall of the vessel, the wall having at least an inner layer formed of a relatively low-shrinkage polymeric material, and an outer layer, bonded to the inner layer, of a relatively high-shrinkage polymeric material;

raising the temperature of the wall from ambient temperature to a temperature above a threshold curing temperature;

maintaining the temperature at above the threshold curing temperature for sufficient time for a post-curing reaction to proceed to completion or near completion; and allowing the temperature of the wall to return to ambient temperature.

An embodiment of the invention is described in detail in the following passages of the specification which refer to the accompanying drawings. The drawings, however, are merely illustrative of how the invention might be put into effect, so that the specific form and arrangement of the various features shown is not to be understood as limiting on the invention.

DETAILED DESCRIPTION

Figure 1:
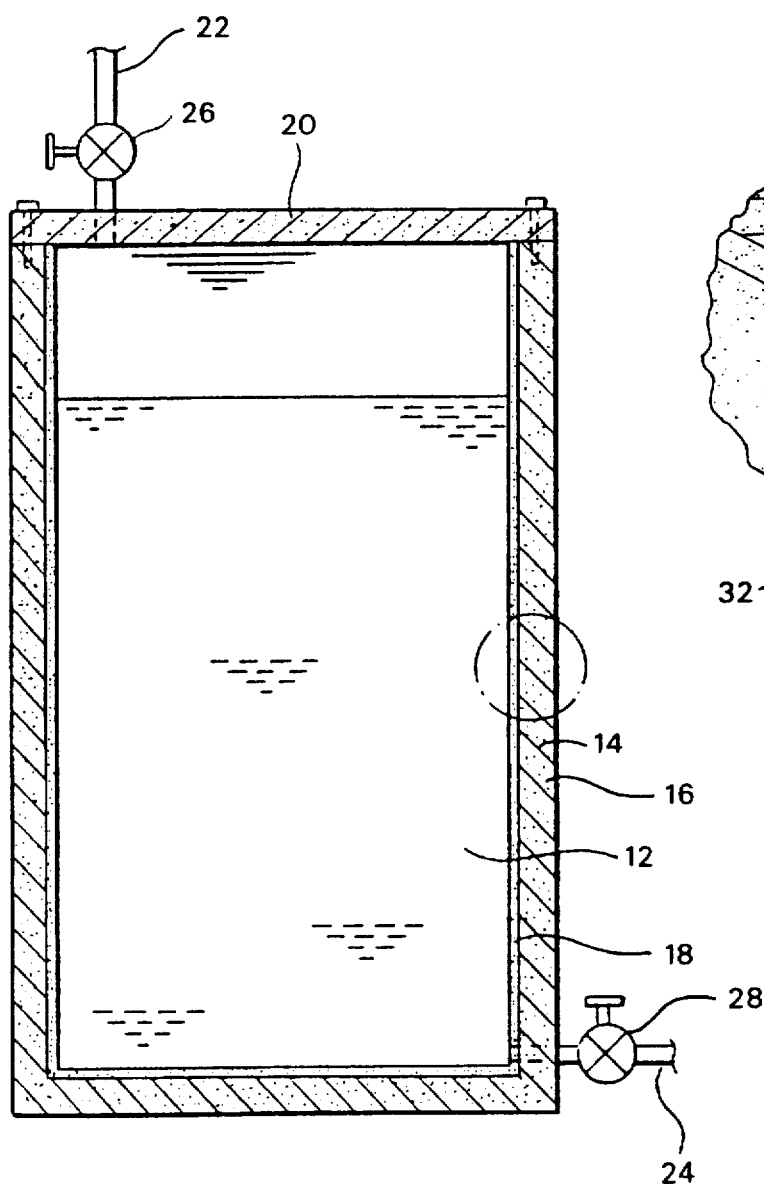
FIG. 1 shows a cross-sectional side view of a vessel having a side wall manufactured in accordance with the invention.
Figure 2:
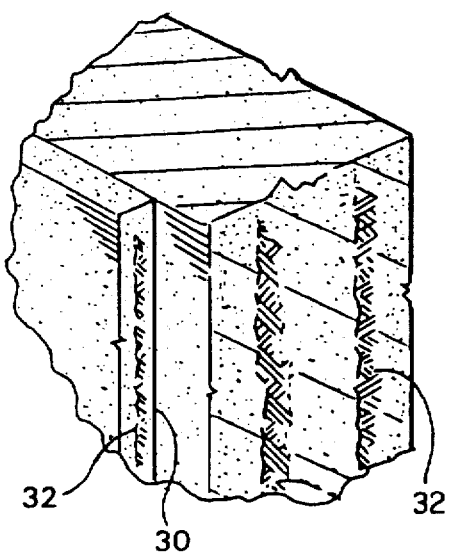
FIG. 2 shows a perspective view of a section of the wall from the demarcated area depicted in FIG. 1.

The vessel 10 shown in the drawings is a reaction vessel adapted to contain an a corrosive liquor 12. The vessel 10 has a side wall 14 which is comprised of an outer layer 16 and an inner layer 18. The vessel has a pressure lid 20 with an inlet 22 into the vessel and an outlet 24 therefrom. Valves 26 and 28 control the inlet and outlet respectively. Each layer is reinforced with a fibre reinforcing 32. The reinforcing 32 is preferably glass fibre chopped strand mat.

The inner layer 18 is formed of a polymeric material which has generally low-shrinkage characteristics during curing. The outer layer is formed of a polymeric material which has generally high-shrinkage characteristics. The two materials are bonded together at their interface 30, the bond being such that during curing the relative shrinkages between the two materials will not result in delamination of the layers. By selecting a low-shrinkage material for the inner layer and a high-shrinkage material for the outer layer, the material exposed to the corrosive liquor 12 will be in a state of compressive residual stress which thereby retards or eliminates crack initiation and propagation. The material from which the inner layer 18 is formed will, in any event, be selected to be resistant to general attack and degradation by the corrosive liquor, particularly with respect to general corrosion and degradation at the prevailing temperature of the liquor.

It is preferred that readily available commercial resins are used for both the inner and outer layers. A great deal of information exists regarding the general mechanical properties of commercial resins, in particular their resistance to chemical attack and their temperature capabilities. Various commercially available resins have been tested for both inner and outer layers. It is found that, for the inner layer, resins of the vinyl ester types are particularly suitable. Examples of such resins, manufactured by Dow Chemicals, and commercially sold under the name Derakane types 411 and 470 have been found to be suitable. For the high-shrinkage outer layer 16 modified isophthalic polyester resins have been found to be suitable. Examples of such materials are those manufactured by Scott-Bader and sold under the names Crystic 392 and Crystic 600. Such resins are considered to be suitable because of their high shrinkage on post-curing and the fact that they are relatively inexpensive. The outer layer 16 is generally far thicker than the inner layer 18 and therefore a relatively low-priced outer layer is advantageous from a cost viewpoint.

Clearly, many different types of resin materials could be used for both the inner and the outer layers. As previously mentioned, it is important that the outer layer has a far higher coefficient of shrinkage than the inner layer upon curing so that after post-curing the inner layer has an induced compressive stress. Tables of relative shrinkage properties, the so-called "coefficient of shrinkage", of commercially available resins are available and selection of the resin will be made for the particular environment with which the vessel will be designed to contend.

Having determined families of candidate resins, for both the high-shrinkage and low-shrinkage layers, test specimens of these resin types were fabricated in accordance with the applicable manufacturer's recommendations using standard procedures, and were then instrumented with pairs of electrical-resistance strain gauges and electrical-resistance temperature transducers. The free post-curing shrinkages ranged from 2000 to 6000 micro-strain. Having determined these free shrinkage values, simple theory of mechanics of solids allows the prediction of residual stress values that would prevail in post-cured fabrications consisting of any combination of these resins. Depending upon the reinforcement types and contents in the inner and outer layers in a composite using two distinct resin types, these values suggest that residual compressive stresses as high as 10 MPa, typically between 4 and 10 MPa could be generated in the inner layer 18. However, to determine whether the actual residual stresses in a fabrication were of the same order as those predicted, testing was carried out whereby a number of specimens were constructed, making use of the potentially most suitable resin types from the candidate families, judged on the basis of their recorded free shrinkages. These specimens thus made use of resin types likely to introduce a reasonable level of compressive stress into the material intended for exposure to the corrosive liquor whilst maintaining an adequate degree of resistance to general corrosion and high-temperature attack. The generated residual stresses were measured by incremental hole drilling, based upon the measured relaxation which accompanies the removal of stressed material.

Compressive residual stresses between 5 and 7 MPa were measured, these values being in reasonable agreement with the theoretically predicted values and, more importantly, of sufficient level to retard crack propagation rate by three to four orders of magnitude (1000 to 10000 times) in comparison with rates in material in which no compressive residual stress exists when exposed to similar acidic environments. Such a level of compressive residual stress would thus be expected to eliminate environmentally assisted cracking from occurring within the design life of the vessel. This contrasts markedly with the failures within as short a period as five months from the date of commissioning that have occurred in conventionally constructed vessels in acid/solvent environments, due to the aforementioned problem of environmentally assisted cracking.

With regard to the importance of the soundness of the bond between the layers, all of the test specimens of the juxtaposed vinyl ester and polyester composites were examined after post-curing. No signs of delamination at the interface between the compressive and tensile layers could be detected.

Clearly, many suitable methods of construction of the vessel could be used to obtain the advantages of the principles of the invention. The inner layer, which would be exposed to the corrosive fluid, would be a resin-rich region preferably with chopped strand mat re-inforcement. This layer would be laid up first onto the mould or other former used for fabricating the vessel, and the resin would be allowed to gel prior to application of subsequent layers. The high post-curing shrinkage resin, used in the outer layer, would be used for the bulk of the fabrication not adapted to be exposed to the corrosive fluid, typically in a proportion ranging from 70 to 95% of the total thickness of the structure. This proportion would, on shrinkage, create relatively large compressive stress values in the low-shrinkage material in combination with low-order tensile residual stress in the high-shrinkage outer layer. The first lay of reinforcement used in the outer layer would preferably be of the chopped strand glass fibre mat type to ensure integrity of the bond between the two materials. Any conduits which pass through the wall of the vessel would generally only be inserted after fabrication of the wall had been completed.

Following completion of the lay-up of the layers, a post-curing heat treatment would be carried out on the composite structure for a time and at a temperature sufficient to ensure adequate post-curing of the resins in both layers. This would involve, generally, the elevation of the temperature of the vessel to a value at which the post-curing reaction is initiated and the vessel would then be maintained at that temperature for sufficient time for significant post-curing to take place. Preferably the post-curing would be completed at least to a significant extent prior to the temperature of the vessel being reduced again to ambient temperature. In all other respects, the manufacture of the vessel would be according to standard procedures. Other manufacturing techniques could be used for manufacture of the vessel such as wet hand lay-up, filament winding, spray or pre-impregnated sheet layer construction.

Note that in this specification the term "vessel" includes within its scope containers, pipes, conduits, channels and the like for containing or conveying fluids. The term "fluids" includes within its scope fluids, particulate solid materials, jelly-like substances, and the like.

We claim:

1. A vessel for containing or conveying a fluid comprising, a wall having at least an inner layer adapted to be adjacent to or in contact with the fluid and an outer layer, each layer being comprised of a matrix of polymeric material, the polymeric materials of the inner and outer layers being differently constituted, the two layers being bonded together, the polymeric material of the inner layer having a coefficient of shrinkage during curing which is less than the coefficient of shrinkage of the polymeric material in the outer layer so that the inner layer of the wall has a post-curing residual compressive stress induced therein by the outer layer.

2. A vessel according to claim 1 wherein at least one of the layers has a fibre reinforcement.

3. A vessel according to claim 2 wherein the reinforcement is a chopped strand glass fibre mat.

4. A vessel according to claim 1 wherein said wall has been subjected to a post-curing shrinkage operation.

5. A vessel according to claim 1 wherein the respective resins in the inner and outer layers are selected so that the bond between the two layers is sufficiently strong to ensure that delamination of the layers does not occur during curing or normal operation of the vessel.

6. A vessel according to claim 1 wherein the vessel is a pressure vessel.

7. A vessel according to claim 1 wherein the vessel is adapted to carry a corrosive fluid.

8. A vessel according to claim 1 wherein the inner layer comprises a vinyl ester.

9. A vessel according to claim 1 wherein the outer layer comprises a member selected from the group consisting of an isophthalic polyester or a modified isophthalic polyester.

10. A vessel according to claim 1 wherein the thickness of the inner and outer layers and the respective polymeric materials are selected so that shrinkage of the outer layer relative to that of the inner layer induces a residual compressive stress in the inner layer of between 4 and 10 MPa.

11. A vessel according to claim 1 wherein the outer layer comprises between 70 and 95% of the overall thickness of the wall.

* * * * *